(12) United States Patent
Golla et al.

(10) Patent No.: US 7,565,022 B2
(45) Date of Patent: Jul. 21, 2009

(54) BIT-PLANE FORMATTING INCLUDING ZERO BIT-PLANE DETECTION

(75) Inventors: Kumar S. Golla, Plano, TX (US); David K. Vavro, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 807 days.

(21) Appl. No.: 10/741,038

(22) Filed: Dec. 19, 2003

(65) Prior Publication Data

US 2005/0135689 A1    Jun. 23, 2005

(51) Int. Cl.
G06K 9/36 (2006.01)
(52) U.S. Cl. .............. 382/240; 382/232; 382/248; 382/251
(58) Field of Classification Search ............. 382/232, 382/307
See application file for complete search history.

(56) References Cited

U.S. PATENT DOCUMENTS

| | | | |
|---|---|---|---|
| 6,674,536 B2* | 1/2004 | Long et al. | 358/1.15 |
| 6,950,558 B2* | 9/2005 | Schwartz et al. | 382/240 |
| 7,016,545 B1* | 3/2006 | Schwartz et al. | 382/239 |
| 7,127,111 B2* | 10/2006 | Fukuhara et al. | 382/232 |
| 2003/0076999 A1* | 4/2003 | Schwartz et al. | 382/247 |

* cited by examiner

Primary Examiner—Jingge Wu
Assistant Examiner—John W Lee
(74) Attorney, Agent, or Firm—Kacvinsky LLC

(57) ABSTRACT

A method and apparatus for accelerating the conversion and detecting image data in pixel format into bit-plane format and bit plane format to pixel format for JPEG2000 compression and decompression is disclosed. In one embodiment, a method for encoding coefficients comprises applying one or more wavelet transforms to generate multiple coefficients, converting the pixel coefficients into bit-plane format and detecting zero bit-planes. This causes the image data in pixel to be broken into bit planes and stored in memory. If all the bits in a selected pixel plane are zero, an indication is stored in an N bit memory array corresponding to the N bit planes of the pixel code block that is processed. The indicator bits are useful in speeding up further compression.

14 Claims, 8 Drawing Sheets

BIT-PLANE FORMATTING INCLUDING ZERO BIT-PLANE DETECTION

RELATED APPLICATIONS

This application is related to U.S. application Ser. No. 10/742,381, filed on Dec. 19, 2003, entitled "Magnitude Refinement Coding"; U.S. application Ser. No. 10/74,572, filed on Dec. 19, 2003, entitled "Run Length Coding and Decoding"; U.S. application Ser. No. 10/741,027, filed on Dec. 19, 2003, entitled "Sign Coding and Decoding"; U.S. application Ser. No. 10/742,118, filed on Dec. 19, 2003, entitled "Zero Coding"; and U.S. application Ser. No. 10/742,155, filed on Dec. 19, 2003, entitled "Zero Coding or Run Length Coding Decision."

BACKGROUND

The JPEG 2000 standard utilizes transforms and provides a coding scheme and code stream definition for images. (See JPEG2000 standard, Information Technology—JPEG 2000 Image Coding System: Core Coding System, ISO/IEC FDIS 15444-1: 2000 JPEG Image Coding System, incorporated herein by reference.) Under the JPEG 2000 Standard, each image may be divided into rectangular tiles. If there is more than one tile, the tiling of the image creates tile-components. After tiling of an image, the tile-components are decomposed into one or more different decomposition levels using a wavelet transformation. These decomposition levels contain a number of sub-bands populated with coefficients that describe the horizontal and vertical spatial frequency characteristics of the original tile-components. The coefficients provide frequency information about a local area, rather than across the entire image. In particular, a small number of coefficients completely describe a single sample.

In JPEG2000, the arithmetic coding and decoding is performed bit-plane by bit-plane, from the most significant bit plane to the least significant bit plane. This reveals a weak point in processors, as they are not efficient when operating in the bit plane level in 2D.

DETAILED DESCRIPTION

The principles of the arrangement described herein have general applicability to coding symbols representative of transform coefficients of one or more blocks of a digital image. For ease of explanation, the preferred embodiment is described with reference to JPEG2000. However, it is not intended that the present invention be limited to the described arrangement. For example, the invention may have application to bit-plane coding techniques in general and other coding techniques.

In JPEG2000, discrete wavelet transform coefficient bits are arranged into code-blocks and coded in bit plane order using three coding passes for each bit plane. A code-block is defined as a rectangular block within a sub-band. The coefficients inside the code-block are coded a bit plane at a time, starting with the most significant bit plane having a non-zero element and ending with the least significant bit plane.

For each bit plane in a code-block, a particular code-block scan pattern is used for each significance propagation, magnitude refinement and cleanup pass. Each coefficient bit is coded only once in one of the three passes. The pass in which a coefficient bit is coded depends on the conditions for that pass. For each pass, contexts are created using the significance states of neighboring coefficient bits of the coefficient bit currently being coded. The context is passed to an arithmetic coder along with the bit stream to effect entropy coding.

A method and apparatus for accelerating the conversion and detecting image data in pixel format into bit-plane format and bit plane format to pixel format for JPEG2000 compression and decompression is disclosed. In one embodiment, a method for encoding coefficients comprises applying one or more wavelet transforms to generate multiple coefficients, converting the pixel coefficients into bit-plane format and detecting zero bit-planes. This causes the image data in pixel to be broken into bit planes and stored in memory. If all the bits in a selected pixel plane are zero, an indication is stored in an N bit memory array corresponding to the N bit planes of the pixel code block that is processed. The indicator bits are useful in speeding up further compression.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
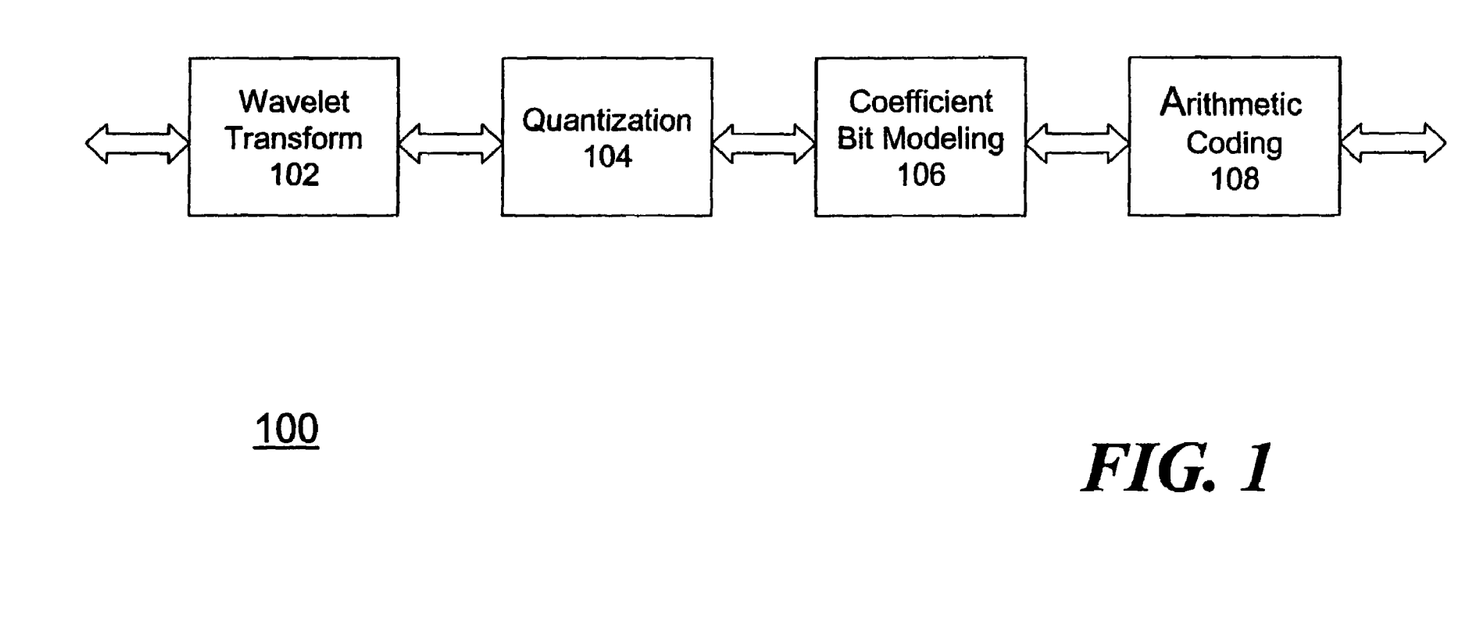
FIG. 1 illustrates a block diagram of one embodiment of a coder embodying the invention.

Before proceeding with a description of the preferred arrangement, a brief review of the JPEG2000 coding method is given. Referring to FIG. 1, a block diagram of one embodiment 100 of a coder embodying the invention is illustrated. As mentioned previously, JPEG2000 divides a whole image into one or more image tile components, each of which are then 2-D discrete wavelet transformed. The transform coefficients of each image tile component are then grouped into sub-bands, which sub-bands are further partitioned into rectangular code blocks before each code block is then entropy encoded.

In particular, embodiment 100 of coder includes a discrete wavelet transform (DWT) 102, quantizer 104, coefficient bit modeler 106 and entropy coder 108 suitable for compressing images in accordance with JPEG2000. The original image is first divided into tiles. These tiles are rectangular arrays that include the same relative portion of all the components that make up the image. Thus, tiling of the image actually creates tile-components that can be decoded independently of each other. These tile-components can also be extracted and reconstructed independently. This tile independence provides one of the methods for extracting a region of the image.

Figure 2:
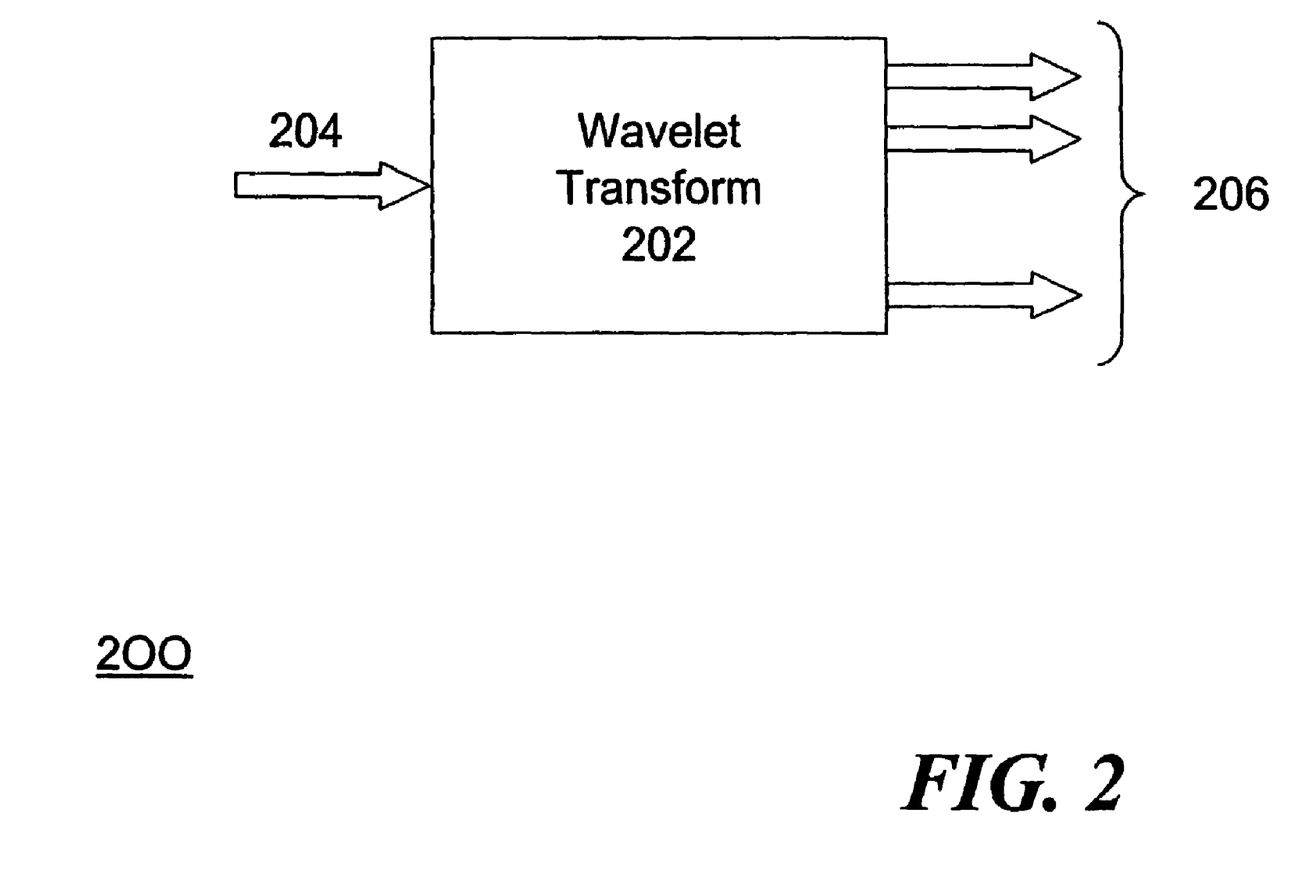
FIG. 2 illustrates a block diagram of one embodiment of a DWT decomposing an original image into subbands.

FIG. 2 illustrates a block diagram of one embodiment 200 of a DWT 202 decomposing an original image 204 into sub-bands 206. The tile components are decomposed into different decomposition levels using a wavelet transform. These decomposition levels contain a number of sub-bands populated with coefficients that describe the horizontal and vertical spatial frequency characteristics of the original tile-component planes. The coefficients provide frequency information about a local area, rather than across the entire image. That is, a small number of coefficients completely describe a single sample. A decomposition level is related to the next decomposition level by spatial powers of two. That is, each successive decomposition level of the sub-bands has approximately half the horizontal and half the vertical resolution of the previous. Images of lower resolution than the original are generated by decoding a selected subset of these sub-bands.

For example, a first DWT stage decomposes the original image ($LL_0$) into four sub-bands, denoted by the labels $LL_1$, $HL_1$, $LH_1$, and $HH_1$. The labels indicate the filtering and decomposition level ($LL_1$=low-pass filtering horizontally, low-pass filtering vertically, at the 1st level of decomposition). These sub-bands are populated with wavelet coefficients that describe spatial frequency characteristics of the original image. The second stage further breaks down $LL_1$ into the four sub-bands $LL_2$, $HL_2$, $LH_2$, and $HH_2$. Although only three such stages are shown in FIG. 2, this process may continue for many stages. Each LLn sub-band is a reasonable low resolution rendition of $LL_{n-1}$ with half the width and height.

Although there are as many coefficients as there are samples, the information content tends to be concentrated in just a few coefficients. Through quantization 104, the information content of a large number of small magnitude coefficients is further reduced. Additional processing by the entropy encoder reduces the number of bits required to represent these quantized coefficients, sometimes significantly compared to the original image.

The individual sub-bands of a tile-component are further divided into code-blocks. These rectangular arrays of coefficients can be extracted independently. In particular, each sub-band, comprised of coefficients produced in the DWT, is subjected to uniform scalar quantization in the quantization step. The quantized coefficients of the sub-bands are further broken down into two-dimensional arrays (for example, 64×64 or 32×32 samples) called code-blocks.

The coefficients are associated with different sub-bands arising from the transform applied. These coefficients are then arranged into rectangular blocks with each sub-band, called code-blocks. These code-blocks are then coded a bit-plane at a time starting from the most significant bit-plane with a non-zero element to the least significant bit-plane.

For each bit-plane in a code-block, a special code-block scan pattern is used for each of the coding passes. Each coefficient bit in the bit-plane is coded in only one the three coding passes. The coding passes are called significance propagation, magnitude refinement, and cleanup. For each pass, contexts are created which are provided to the arithmetic coder, CX, along with the bit stream, CD. The arithmetic coding step uses the context vectors and the corresponding coefficients to create a compressed data stream. The arithmetic coder is reset according to selected rules.

Figure 3:
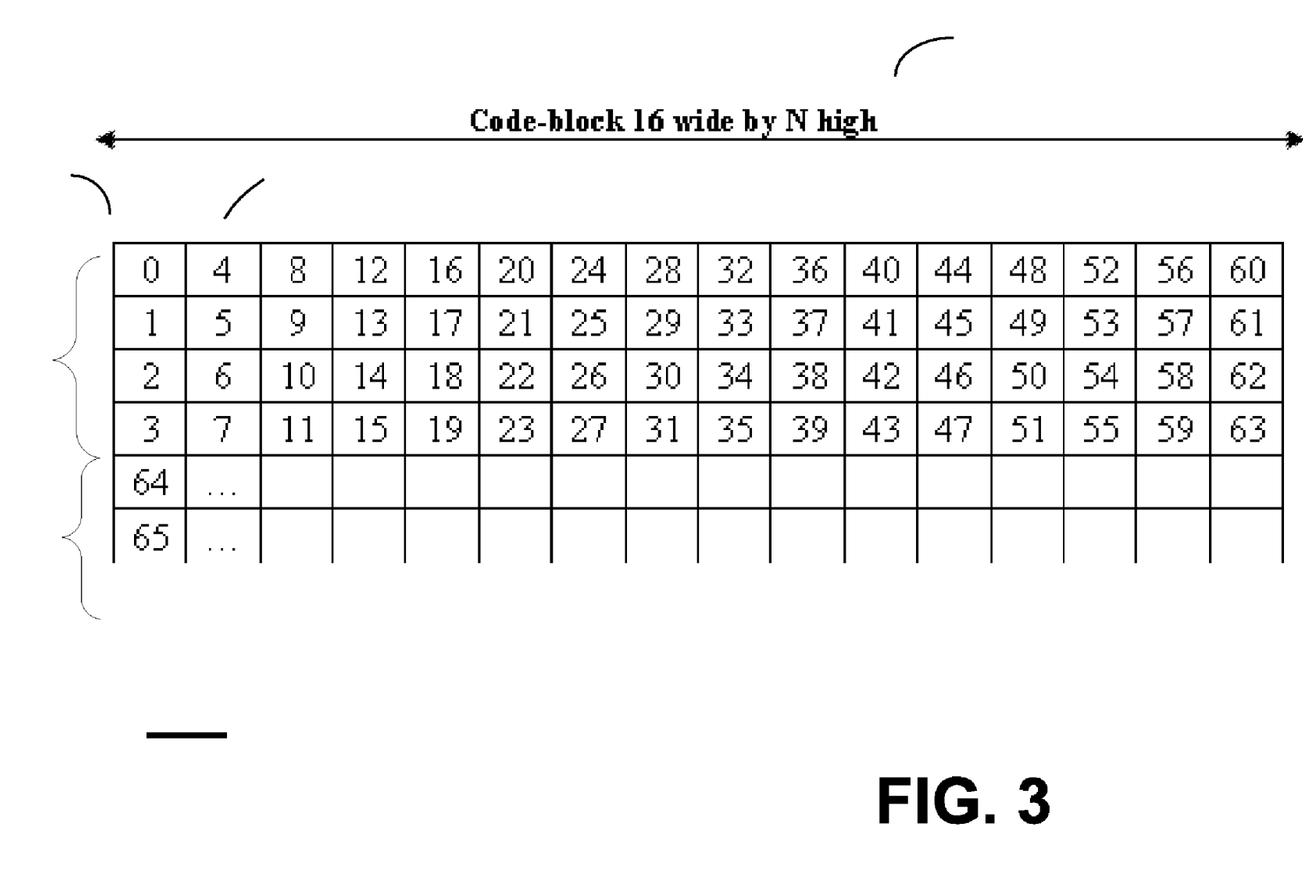
FIG. 3 illustrates a diagram of an exemplary embodiment of a code-block scan pattern of a code-block.

As stated above, the code-blocks of quantized coefficients are coded with three coding passes. These coding passes are performed on "bit planes," each of which is an array consisting of bits taken from the same position in each coefficient. The first bit plane is comprised of the most significant bits (MSB) of all the coefficient magnitudes in the code-block. The second bit-plane is comprised of the second MSBs of all the coefficient magnitudes in the code-block, and so on. Referring to FIG. 3, each quantized coefficient has four bits, for example, $a_1, a_2, a_3, a_4$. The MSB of each coefficient has a subscript of "1," for example, $a_1$. The first bit plane is comprised of $a_1, b_1, c_1, d_1$, the second bit-plane is comprised of $a_2, b_2, c_2, d_2$ and so forth until the least significant bits (LSB).

FIG. 3 is a diagram of an exemplary embodiment 300 of a code-block scan pattern of a code-block. Each bit-plane is scanned in a particular order. Starting at the top left 302, the first four bits of the first column 304 are scanned. Then the first four bits of the second column 306, until the width 308 of the code-block has been covered. Then the second four bits 310 of the first column are scanned and so on. A similar vertical scan is continued for any leftover rows on the lowest code-blocks in the sub-band.

This scan pattern is followed in each of the three coding passes. The decision as to in which pass a given bit is coded is made based on the "significance" of that bit's location and the significance of neighboring locations. A location is considered significant if a 1 has been coded for that location (quantized coefficient) in the current or previous bit planes.

The first pass is called the significance propagation pass. A bit is coded in this pass if its location is not significant, but at least one of its eight-connected neighbors is significant. If a bit is coded in this pass, and the value of that bit is "1," its location is marked as significant for the purpose of coding subsequent bits in the current and subsequent bit planes. Also, the sign bit is coded immediately after the "1" bit just coded.

The second pass is the magnitude refinement pass (MRP), where all bits from the locations that became significant in a previous bit plane are coded.

The third and final pass is the clean-up pass, where bits not coded in the first two passes are taken care of. The results of these three scanning passes are the context vectors for the quantized coefficients.

In accordance with embodiments of the invention, when encoding and decoding bit planes, magnitude refinement may occur in the magnitude refinement pass. When a sample is already significant, magnitude refinement is used to encode the new bit position. This decision is based on bit state variables Sigma and Eta being zero. When performing magnitude refinement coding, the state variables Sigma's and Sigma-prime are used to determine the output context (CX). The D output is simply equal to the current coding bit of the magnitude.

Figure 4:
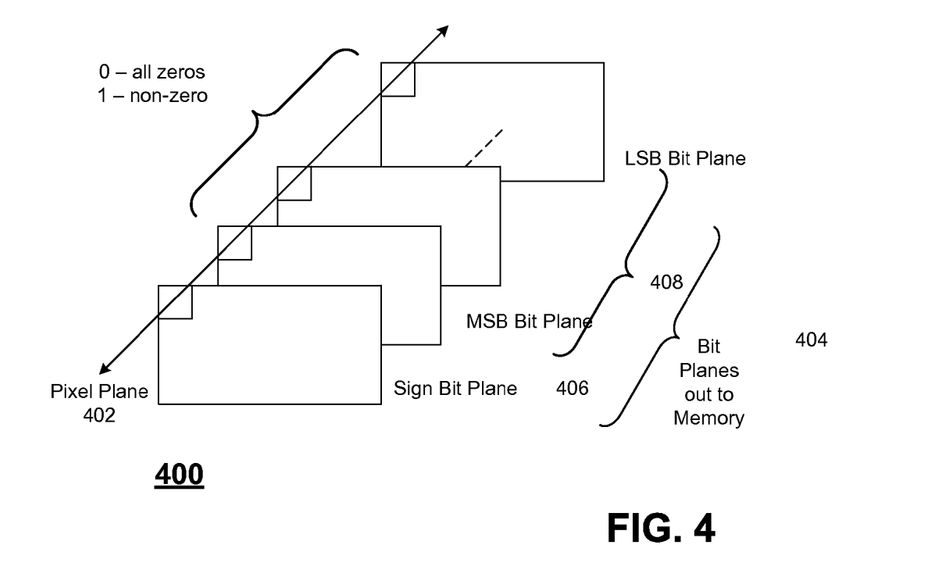
FIG. 4 illustrates a block diagram of one embodiment for converting a pixel plane into bit planes during an encoding stage.

Embodiments of the invention provide a special instruction that accelerates the conversion and checking of image data in pixel format into bit-plane format needed for JPEG2000 image compression and decompression. FIG. 4 illustrates a block diagram of one embodiment for converting a pixel plane into bit planes during the encoding stage. In particular, an instruction breaks the pixel plane format 402 into bit-plane format 404 and checks for all zeros in the bit-plane. During compression, the output of the DWT engine is pixel coefficients usually in one's complement or two's complement form. This pixel data is converted into bit-plane format for further JPEG2000 processing. The bit planes include a sign bit plane 406 as well as a plurality of bit planes 408, ranging from a most significant (MSB) bit-plane, next lower bit plane and so on to a least significant (LSB) bit-plane.

Figure 5:
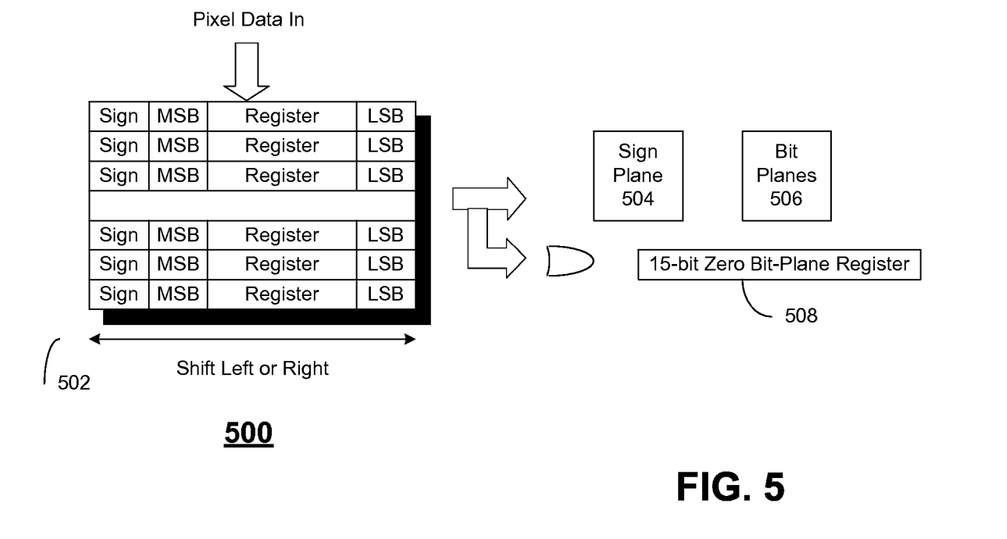
FIG. 5 illustrates a detailed block diagram of one embodiment for converting a pixel plane into bit planes and detecting zero bit planes.

FIG. 5 illustrates a detailed block diagram of an embodiment 500 for converting a pixel plane into bit planes and detecting zero bit planes during the encoding stage. In particular, a pixel plane is converted into a sign bit-plane and N bit-planes. Once the pixel plane is converted into bit planes, zero bit detection occurs. If all the bits in the pixel plane are zero, an indicator, such as a zero, is stored in an N bit memory array 502 corresponding to the N bit planes of the pixel code block that is processed. These indicator bits are useful in speeding up further compression. For example, the zero indicator bits allow some processing stages to be bypassed if all the bits in a bit-plane are zeros. The clean up pass is applied for the first non-zero bit plane. The significant propagation pass, magnitude refinement pass and clean up pass are applied for the remaining bit planes. The leading bit planes with all zeros are ignored. In other words, the clean up pass is bypassed for the leading bit planes with all zeros.

In a typical implementation, the state of a bit-plane is a binary-valued variable which is initialized to zero, but transitions to one after a first non-zero bit value is detected in the bit-plane. This zero is stored in an N bit memory array corresponding to the N bit plane of the pixel code block that is processed. The output is a sign bit-plane 504, N bit-planes (MSB bit plane to LSB bit plane) 506 and the N zero bit plane bits stored in memory 502.

Conventionally, one read and an AND operation are typically required to mask out a bit-plane to be extracted. For example, for a 64×64 16-bit pixel code block it would take 2*64*64*16=131,072 instructions to mask out a bit-plane to be extracted. A further 2*64*64*15 or 122,880 instructions are needed to check the 15 bit planes for all zeros. It would thus take a total of 253,952 cycles to perform this task on a 64×64 pixel code block. With embodiments of the present invention, the task may be performed in 64*64 or 4096 cycles.

In a typical implementation, the N bit zero bit-plane register includes information that is useful in speeding up further JPEG2000 compression. The coder first codes all the bit symbols of the most significant bit-plane of a code block, then all the bit symbols of the next lower bit-plane of the code block and so on to a least significant bit-plane. Within each bit-plane of a code block, the coder codes the bit symbols of the coefficients in three passes in a predetermined order.

The first pass of a bit-plane is called the significance propagation pass (SP pass), the second pass of the bit-plane is called the magnitude refinement pass (MR pass), and the third and last pass of the bit-plane is called the cleanup pass (N pass). The N bit zero bit-plane register includes information that is useful in spending up further JPEG2000 compression by identifying the zero bit planes. The arithmetic coder codes the bit symbols of a bit-plane in the three passes (SP, MR, and N) in the same predetermined order. The arithmetic coder first proceeds to MSB bit-plane that has a non-zero bit in it and skips the SP, MR passes and commences with the N pass. The arithmetic coder then proceeds to the next lower bit plane and codes the bit symbols in the three passes (SP, MR, and N) in that order. It then proceeds to the next lower bit plane and codes the bit symbols in the same order of passes (SP, MR, and N) and so on to the LSB bit-plane.

In addition, each bit-plane of a code block is scanned in a particular order. Starting at the top left, the first four bit symbols of the column are scanned. Then the first four bit symbols of the second column, until the width of the code-block has been covered. Then the second four bit symbols of the first column are scanned and so on. A similar scan is continued for any leftover rows on the lowest code blocks in the sub-band.

Figure 6:
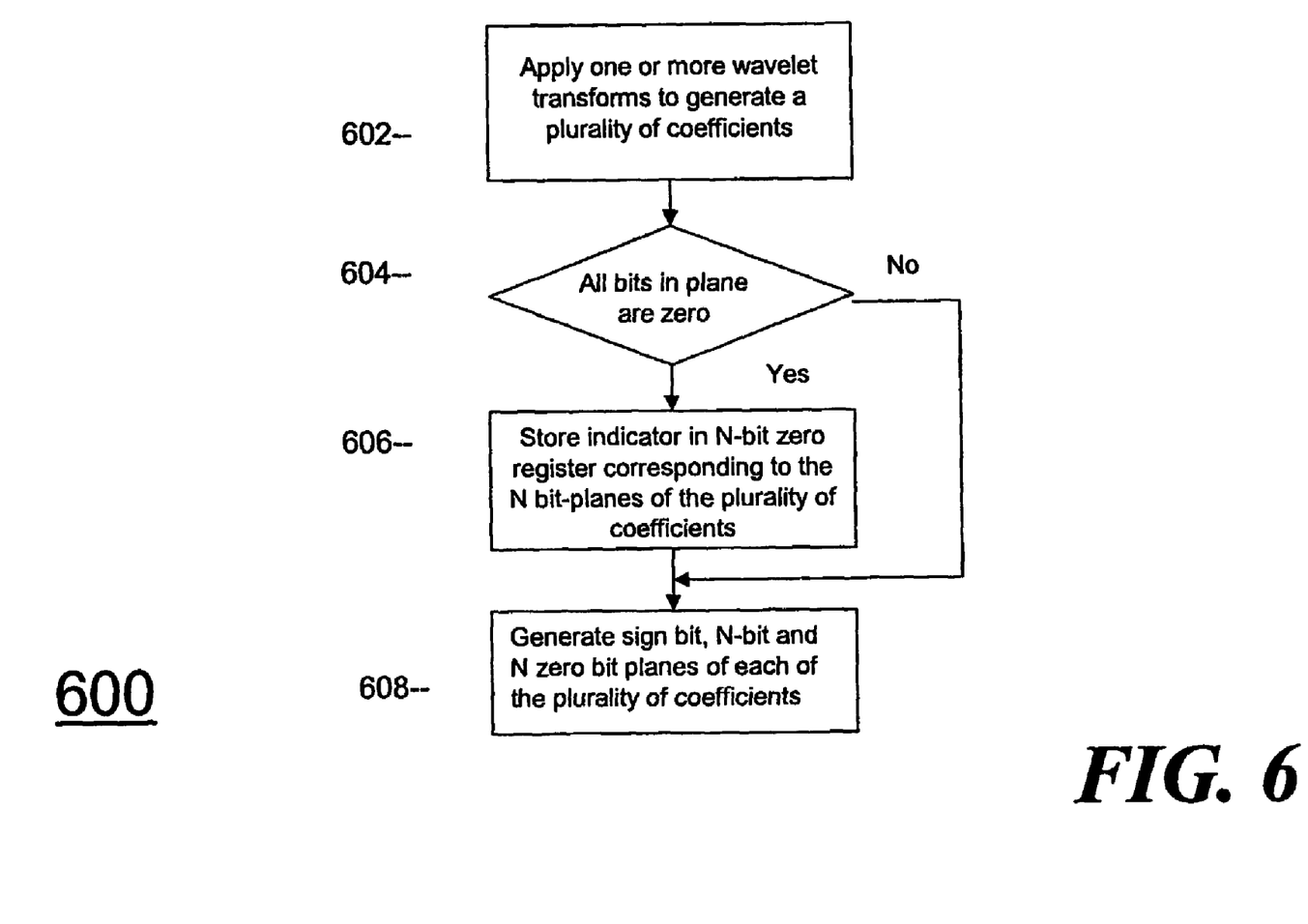
FIG. 6 is a flowchart of an embodiment for encoding coefficients.

FIG. 6 is a flowchart of an embodiment 600 for encoding coefficients.

In step 602, one or more wavelet transforms are applied to generate a plurality of coefficients.

An embodiment of the instruction is then used to convert the plurality of coefficients into bit-planes and identifies zero bit planes in the plurality of coefficients.

In particular, in step 604, it is determined whether all the bits in a plane are zero.

In response to all the bits in a plane being zero (step 604), an indicator is stored in an N-bit zero register part of the memory corresponding to the N bit-planes of the plurality of coefficients being processed (step 606). In a typical implementation, a zero is stored in an N-bit zero register part of the memory corresponding to the N bit-planes of the plurality of coefficients.

In step 608, a sign bit-plane, N bit-planes and N zero bit-planes of each of the plurality of coefficients in memory is generated. N bit planes includes a plurality of bit-planes ranging from a most significant bit-plane to a least significant bit-plane of the plurality of coefficients.

Figure 7:
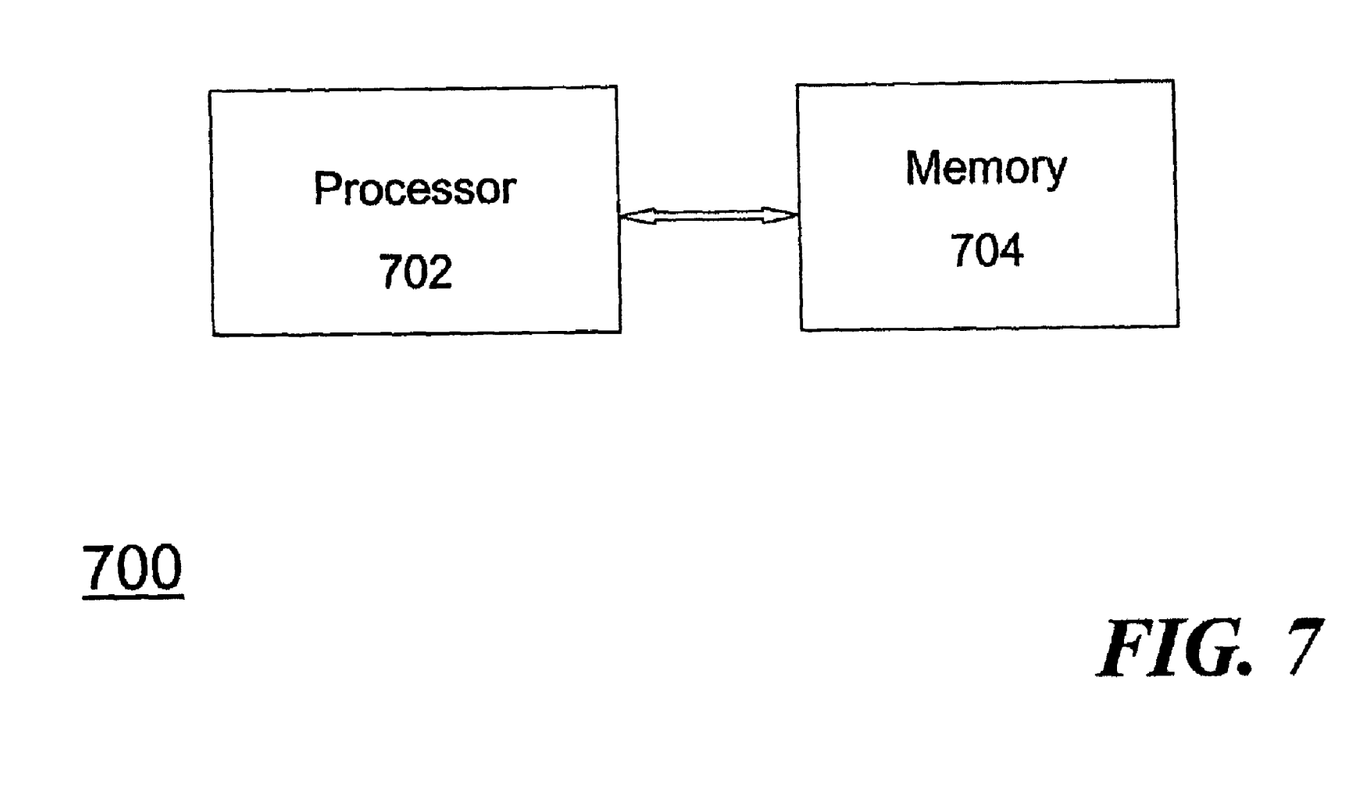
FIG. 7 is an embodiment of a system for implementing embodiments of the invention.

FIG. 7 is an embodiment of a system 700 for implementing embodiments of the invention. In particular, the system includes a processor 702 and memory 704. As noted above, for purposes of this application, a processing system includes any system that has a processor, such as, for example, a digital signal processor (DSP), a micro-controller, an application specific integrated circuit (ASIC), or a microprocessor. The system may be specially constructed for the required purposes, or it may comprise a general purpose computer selectively activated or reconfigured by a computer program stored in the computer. The processor 702 may be configured to format images compatible with the JPEG2000 format.

During encoding, the processor 702 applies one or more wavelet transforms to generate a plurality of coefficients. The processor 702 executes an instruction to convert the plurality of coefficients into bit-planes and identifying zero bit planes in the plurality of coefficients and stores N bit-planes of each of the plurality of coefficients in memory 704 in response to the instruction. In response to all the bits in a plane being zero, the processor stores an indicator in a N-bit zero register part of the memory 704 corresponding to the N bit-planes of the plurality of coefficients being processed.

During decoding, an encoded bit stream including bit-planes is received. The processor executes an instruction to convert the bit-planes into a pixel plane. A pixel plane is generated in response to a sign bit-plane and plurality of bit planes.

The pixel plane is applied to one or more inverse wavelet transforms to generate a reconstructed image.

Figure 8:
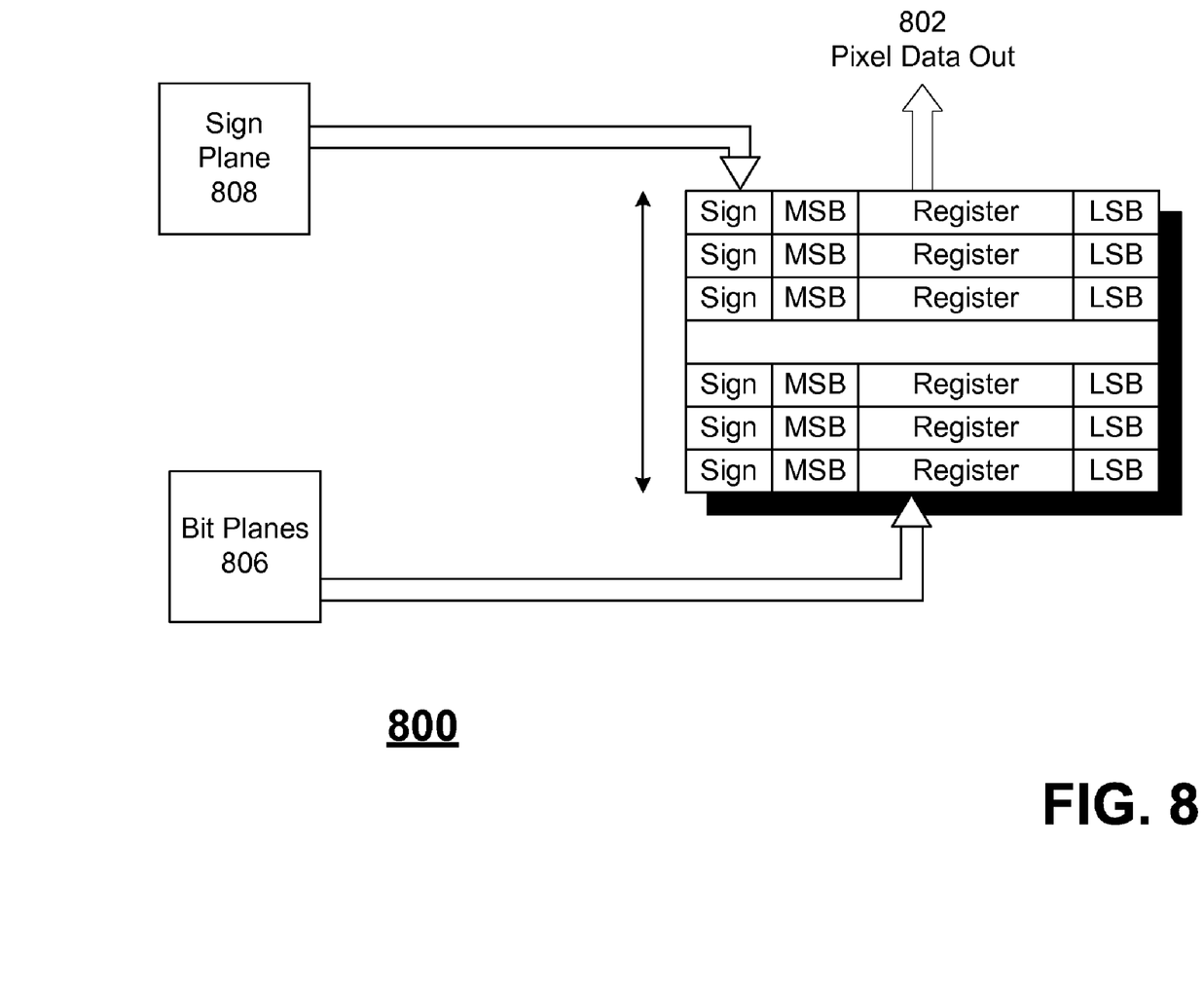
FIG. 8 illustrates a block diagram of one embodiment for converting bit planes into a pixel plane during a decoding stage.

FIG. 8 illustrates a block diagram of one embodiment 800 for converting bit planes into a pixel plane during a decoding stage. The same or similar instruction and hardware may be used for decompression where the bits are decoded from the encoded bit stream and need to be converted into pixels. However, no checking for zero bit planes is necessary at that time. Referring to FIG. 8, pixel planes 802 are generated from a sign plane 804 and bit planes 806.

Figure 9:
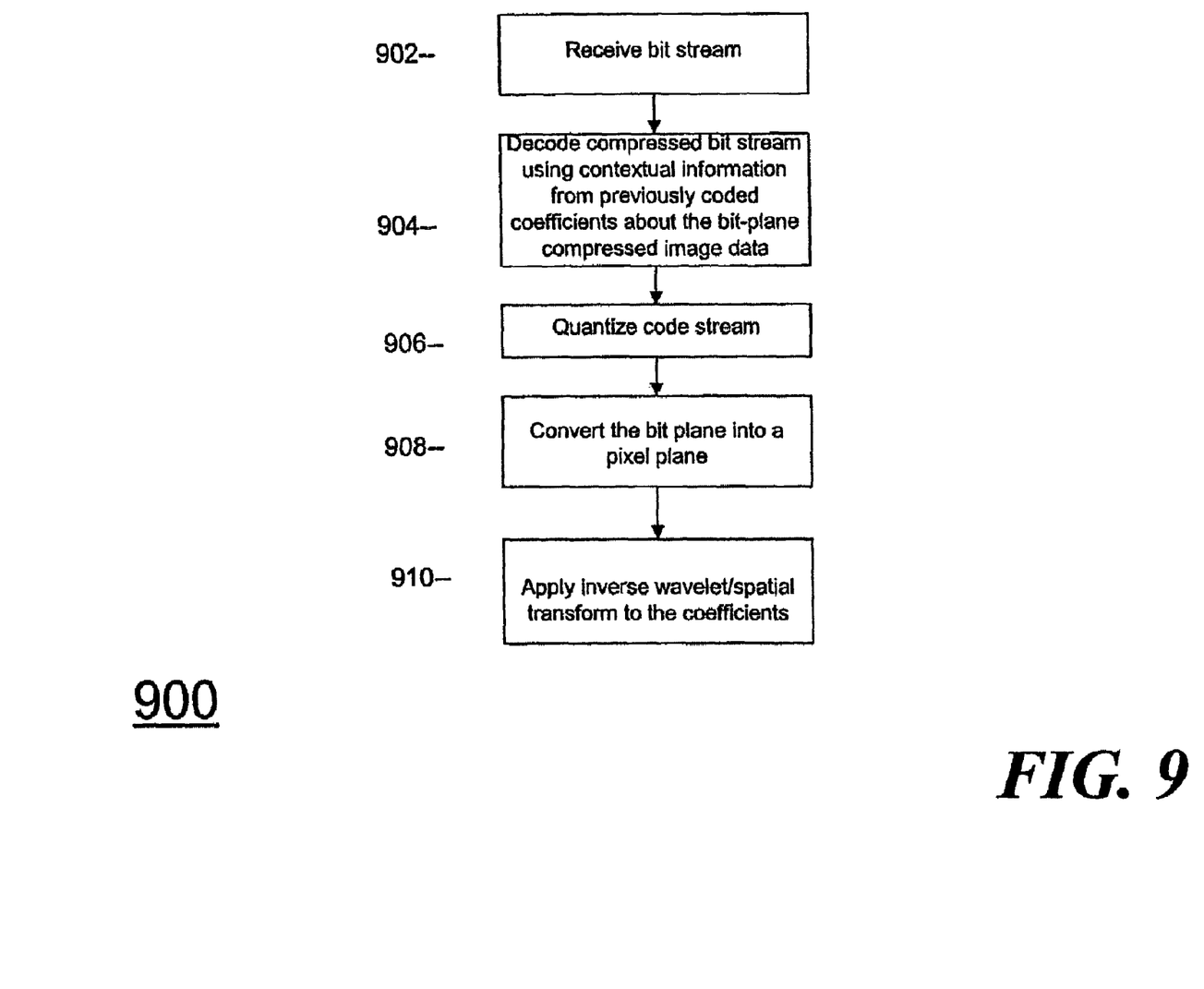
FIG. 9 is a flowchart of an embodiment for decoding coefficients.

FIG. 9 is a flowchart 900 of an embodiment for decoding coefficients.

During decompression, bits are decoded from the encoded bit stream and need to be converted into pixels. The decoding of a JPEG 2000 code stream is performed by reversing the order of the encoding steps. During the decoding process, a bit stream initially is received by data ordering block that regroups layers and sub-band coefficients (step 902). Arithmetic coder uses contextual information from previously coded coefficients about the bit-plane compressed image data, and its internal state, to decode a compressed bit stream (step 904). The code stream is then quantized by the quantizer (step 906), which may be quantizing based on a region of interest. After quantization, an instruction is used to convert the bit-planes into a pixel plane (step 908). An inverse wavelet/spatial transform is applied to the coefficients (step 910). This results in generation of a reconstructed image.

Conventionally during decode, 16 fetch and mask operations, 16 shift operations and 16 OR operations are required for generating one pixel. Generating one 16-bit pixel requires 3*16=48 cycles. A 64×64 pixel code block would require 48*64*64 or 196,608 cycles. With embodiments of the present invention, the task may be performed in 64*64 or 4096 cycles.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Embodiments of the invention may be implemented in digital signal processors as well as standard processors because of the capabilities it provides for processing applications such as JPEG2000 as well as existing applications such as JPEG. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed:

1. A method for encoding coefficients comprising:
   applying by a processor one or more wavelet transforms to generate a plurality of coefficients that describe horizontal and vertical spatial frequency characteristics of original tile-component planes;
   executing a special instruction by a processor to accelerate conversion of the plurality of coefficients into bit-planes by reducing the number of clock cycles required of the processor to convert the coefficients during compression, identify zero bit planes in the plurality of coefficients and generate a sign bit-plane, N bit-planes and N zero bit-planes of each of the plurality of coefficients in memory;
   in response to all bits in a plane being zero, storing by the processor an indicator in a N-bit zero register part of the memory corresponding to the N bit-planes of the plurality of coefficients being processed; and
   storing by the processor N bit-planes of each of the plurality of coefficients in memory in response to the instruction.

2. The method claimed in claim 1, wherein storing an indicator in a N-bit zero register part of the memory corresponding to the N bit-planes of the plurality of coefficients being processed further comprises:

storing a zero in a N-bit zero register part of the memory corresponding to the N bit-planes of the plurality of coefficients.

3. The method claimed in claim 1, wherein generating a sign bit-plane, N bit-planes and N zero bit-planes of each of the plurality of coefficients in memory further comprises:

N bit planes includes a plurality of bit-planes ranging from a most significant bit-plane to a least significant bit-plane of the plurality of coefficients.

4. A method for decoding coefficients comprising:

receiving by a processor an encoded bit stream including bit-planes;

decoding by the processor the encoded bit stream by an arithmetic coder using contextual information from previously coded coefficients about bit-plane compressed image data;

executing a special instruction by a processor to accelerate conversion of the bit-planes into a pixel plane by reducing the number of clock cycles required of the processor to convert the bit-planes during decompression and generate a pixel plane in response to a sign bit-plane and plurality of bit planes; and applying by the processor the pixel plane to one or more inverse wavelet transforms to generate a reconstructed image.

5. A system comprising:

a memory; and a processor to apply one or more wavelet transforms to generate a plurality of coefficients, execute a special instruction to accelerate conversion of the plurality of coefficients that describe horizontal and vertical spatial frequency characteristics of original tile-component planes into bit-planes by reducing the number of clock cycles required of the processor to convert the coefficients during compression, identify zero bit planes in the plurality of coefficients and generate a sign bit-plane, N bit-planes and N zero bit-planes of each of the plurality of coefficients in memory; in response to all bits in a plane being zero, store an indicator in a N-bit zero register part of the memory corresponding to the N bit-planes of the plurality of coefficients being processed; and store N bit-planes of each of the plurality of coefficients in memory in response to the instruction.

6. The system claimed in claim 5, wherein the processor is configured to format images compatible with the JPEG2000 format.

7. The system claimed in claim 5, wherein storing an indicator in a N-bit zero register part of the memory corresponding to the N bit-planes of the plurality of coefficients being processed further comprises:

storing a zero in a N-bit zero register part of the memory corresponding to the N bit-planes of the plurality of coefficients.

8. The system claimed in claim 5, wherein generating a sign bit-plane, N bit-planes and N zero bit-planes of each of the plurality of coefficients in memory further comprises:

N bit planes includes a plurality of bit-planes ranging from a most significant bit-plane to a least significant bit-plane of the plurality of coefficients.

9. A computer readable storage medium having stored therein a plurality of computer readable instructions executable by a processor to encode coefficients comprising:

applying one or more wavelet transforms to generate a plurality of coefficients that describe horizontal and vertical spatial frequency characteristics of original tile-component planes;

executing a special instruction to accelerate conversion of the plurality of coefficients into bit-planes by reducing the number of clock cycles required of the processor to convert the coefficients during compression, identify zero bit planes in the plurality of coefficients and generate a sign bit-plane, N bit-planes and N zero bit-planes of each of the plurality of coefficients in memory;

in response to all the bits in a plane being zero, storing an indicator in a N-bit zero register part of the memory corresponding to the N bit-planes of the plurality of coefficients being processed; and storing N bit-planes of each of the plurality of coefficients in memory in response to the instruction.

10. The computer readable medium claimed in claim 9, wherein storing an indicator in a N-bit zero register part of the memory corresponding to the N bit-planes of the plurality of coefficients being processed further comprises:

storing a zero in a N-bit zero register part of the memory corresponding to the N bit-planes of the plurality of coefficients.

11. The computer readable medium claimed in claim 9, wherein generating a sign bit-plane, N bit-planes and N zero bit-planes of each of the plurality of coefficients in memory further comprises:

generating N bit planes includes a plurality of bit-planes ranging from a most significant bit-plane to a least significant bit-plane of the plurality of coefficients.

12. A computer readable storage medium having stored therein a plurality of computer readable instructions executable by a processor to decode coefficients comprising:

receiving an encoded bit stream including bit-planes;

decoding the encoded bit stream by an arithmetic coder using contextual information from previously coded coefficients about bit-plane compressed image data;

executing a special instruction to accelerate conversion of the bit-planes into a pixel plane by reducing the number of clock cycles required of the processor to convert the bit-planes during decompression and generate a pixel plane in response to a sign bit-plane and plurality of bit planes; and applying the pixel plane to one or more inverse wavelet transforms to generate a reconstructed image.

13. A system comprising:

a memory; and a processor to receive an encoded bit stream including bit-planes; decode the encoded bit stream by an arithmetic coder using contextual information from previously coded coefficients about bit-plane compressed image data; execute a special instruction to accelerate conversion of the bit-planes into a pixel plane by reducing the number of clock cycles required of the processor to convert the bit-planes during decompression; and generate a pixel plane in response to a sign bit-plane and plurality of bit planes; and apply the pixel plane to one or more inverse wavelet transforms to generate a reconstructed image.

14. The system claimed in claim 13, wherein the processor is configured to format images compatible with the JPEG2000 format.

* * * * *

UNITED STATES PATENT AND TRADEMARK OFFICE
CERTIFICATE OF CORRECTION

PATENT NO. : 7,565,022 B2  Page 1 of 1
APPLICATION NO. : 10/741038
DATED : July 21, 2009
INVENTOR(S) : Kumar S. Golla et al.

It is certified that error appears in the above-identified patent and that said Letters Patent is hereby corrected as shown below:

In column 1, line 9, delete "10/74,572," and insert -- 10/741,572, --, therefor.

In column 10, line 10, in Claim 9, after "zero" delete "bit".

Signed and Sealed this

Sixteenth Day of March, 2010

David J. Kappos
*Director of the United States Patent and Trademark Office*